(12) United States Patent
Bayer et al.

(10) Patent No.: US 6,706,084 B2
(45) Date of Patent: Mar. 16, 2004

(54) DEVICE FOR DEFLECTING DEBRIS FROM LAWNMOWER AIR INTAKE

(75) Inventors: Don R. Bayer, Dousman, WI (US); Gerald C. Ruehlow, Oconomowoc, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 0 days.

(21) Appl. No.: 10/144,380

(22) Filed: May 13, 2002

(65) Prior Publication Data

US 2003/0208996 A1 Nov. 13, 2003

(51) Int. Cl.[7] ................................................ B01D 35/00
(52) U.S. Cl. ......................... 55/282; 55/297; 55/385.3; 55/406
(58) Field of Search ..................... 55/282, 297, 385.3, 55/306, 406, 408, 434, 467

(56) References Cited

U.S. PATENT DOCUMENTS 3,155,473 A * 11/1964 McNeil ........................ 55/294
5,046,458 A    9/1991 Kronich .................... 123/41.63

* cited by examiner

*Primary Examiner*—Robert A. Hopkins
(74) *Attorney, Agent, or Firm*—Boyle Fredrickson Newholm Stein & Gratz S.C.

(57) ABSTRACT

A deflector is provided for deflecting foreign matter from the inlet screen of a rotary lawn motor. The rotary lawn motor has an engine that draws air through the inlet screen. The deflector includes an inner element positionable over a center portion of the inlet screen. A first outer element is positioned over a radially outer portion of the inlet screen. A deflection arm extends between the inner element and the first outer element to deflect the foreign matter away from the inlet screen during operation of the lawnmower.

22 Claims, 8 Drawing Sheets

DEVICE FOR DEFLECTING DEBRIS FROM LAWNMOWER AIR INTAKE

FIELD OF THE INVENTION

This invention relates generally to lawnmowers, and in particular, to a device for deflecting grass clippings and other debris from the air intake screen of a conventional lawnmower.

BACKGROUND AND SUMMARY OF THE INVENTION

Lawnmowers are available in a wide variety of configurations including manually operated and engine driven. Engine driven lawnmowers typically utilize an air cooled combustion engine having a crankshaft coupled to rotatable blades such that the crankshaft rotates the blades in response to operation of the engine. In order to dissipate the heat generated by the engine during operation, air is passed over the cylinders and the crankcase of the engine. To maximize the cooling effect, a fan or blower is incorporated in the flywheel of the engine and used to direct a cooling stream of air across the cylinders and other parts of the engine. In order to direct the cooling stream of air across the desired portions of the engine, an air intake port is provided.

It can be appreciated that during operation of the lawnmower, debris such as grass clippings, small leaves, dirt and other foreign matter may enter the air intake port and collect on the surface of the engine. The build-up of foreign matter on the engine decreases the effects of the cooling air stream on the engine. In fact, the build-up of foreign matter may insulate the engine from the air stream causing the possible overheating and premature wear of the engine.

In order to reduce the possibility of build-up of foreign matter on the engine, an air intake screen is often positioned over the air intake port of a lawnmower. The air intake screens may be fixed or operatively connected to the fan for rotational movement therewith. While on air intake screen decreases the build-up of foreign matter on the surface of the engine, foreign matter may still pass through the air intake screen and build-up on the surface of the engine. Hence, a simple and inexpensive device for further reducing the foreign matter that enters the air intake port of a conventional lawnmower is highly desirable.

Therefore, it is a primary object and feature of the present invention to provide a device for reducing the amount of foreign matter that passes through the air intake screen of a conventional lawnmower.

It is a further object and feature of the present invention to provide a device that reduces the amount of foreign matter that passes through the air intake screen of a conventional lawnmower that is simple to utilize and inexpensive to manufacture.

It is a still further object and feature of the present invention to provide a device for reducing the amount of foreign matter that passes through the air intake screen that may be used with a plurality of prior lawnmowers.

In accordance with the present invention, a deflector is provided for deflecting foreign matter from the inlet screen of a rotary lawnmower. The lawnmower has an engine that draws air through the inlet screen. The deflector includes an inner element positioned over a center portion of the inlet screen. A first outer element is positionable over a radially outer portion of the inlet screen. A deflection arm extends between the inner element and the outer element. It is contemplated that first deflection arm be generally arcuate.

The inner element defines an opening therethrough and a connector extends through the opening in the inner element for interconnecting the inner element to the center portion of the inlet screen. The inner element may also include a second opening therethrough. A second connector extends through the second opening in the inner element for interconnecting the inner element to the center portion of the screen.

The deflector may include a second outer element positionable over the radially outer portion of the inlet screen circumferentially spaced from the first outer element. A second deflection arm extends between the inner element and the second outer element. The first outer element may include an opening therethrough and a connector is provided to extend through the opening in the first outer element to interconnect the first outer element to the radially outer portion of the inlet screen. The second outer element may also include an opening therethrough. A second connector may be provided to extend through the opening in the second outer element to interconnect the second outer element to the radially outer portion of the inlet screen.

The inner element may include an inner ring such that the radially inner ends of the deflection arms may be affixed to the inner ring of the inner element. The inner element may also include a second outer ring radially spaced from the inner ring. The outer ring is affixed to the deflection arms at a location radially spaced from the inner rings. Each outer element of the deflector may include a circumferentially extending portion that is radially spaced and extends circumferentially about the inner ring of the inner element.

In accordance with a further aspect of the present invention, an improvement in a lawnmower is provided. The lawnmower includes an engine and an air intake screen adjacent the engine to allow the engine to draw air through the air intake screen to cool the engine during the operation thereof. The air intake screen has a central portion and a radially outer portion. The improvement includes a central hub positioned over the central portion of the air intake screen and a first deflection arm extending radially from the central hub over the air intake screen.

The central hub may include an aperture therethrough. A connector may extend through the aperture for interconnecting the central hub to a lawnmower. A second deflection arm extends radially from the central hub over the air intake screen at a location circumferentially spaced from the first deflection arm. The first deflection arm terminates at a radially outer end. An outer element is interconnected to a radially outer end of the first deflection arm and is positioned over a radially outer portion of the intake screen. The outer element may include an aperture therethrough. A connector extends through the aperture to interconnect the outer element to the lawnmower.

The outer element may extend circumferentially about the central hub. The central hub may include a first inner ring having a predetermined diameter and a second outer ring having a predetermined diameter greater than the diameter of the inner ring. The inner and outer rings of the central hub are interconnected by the first deflection arm.

In accordance with a still further aspect of the present invention, a device is provided for deflecting foreign matter away from an air intake screen of a lawnmower. The lawnmower includes an engine that draws air through the air intake screen during the operation thereof. The device includes a deflector positionable over the air intake screen. A connector interconnects the deflector to the lawnmower.

The deflector includes a central hub and a first deflection arm extending from the central hub. The central hub includes a first inner ring having a predetermined diameter and a second outer ring having a predetermined diameter greater than the diameter of the inner ring. The inner and outer rings of the central hub are interconnected by the first deflection arm. A second deflection arm may also extend from the central hub. The second deflection arm also interconnects the inner and outer ring of the central hub.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
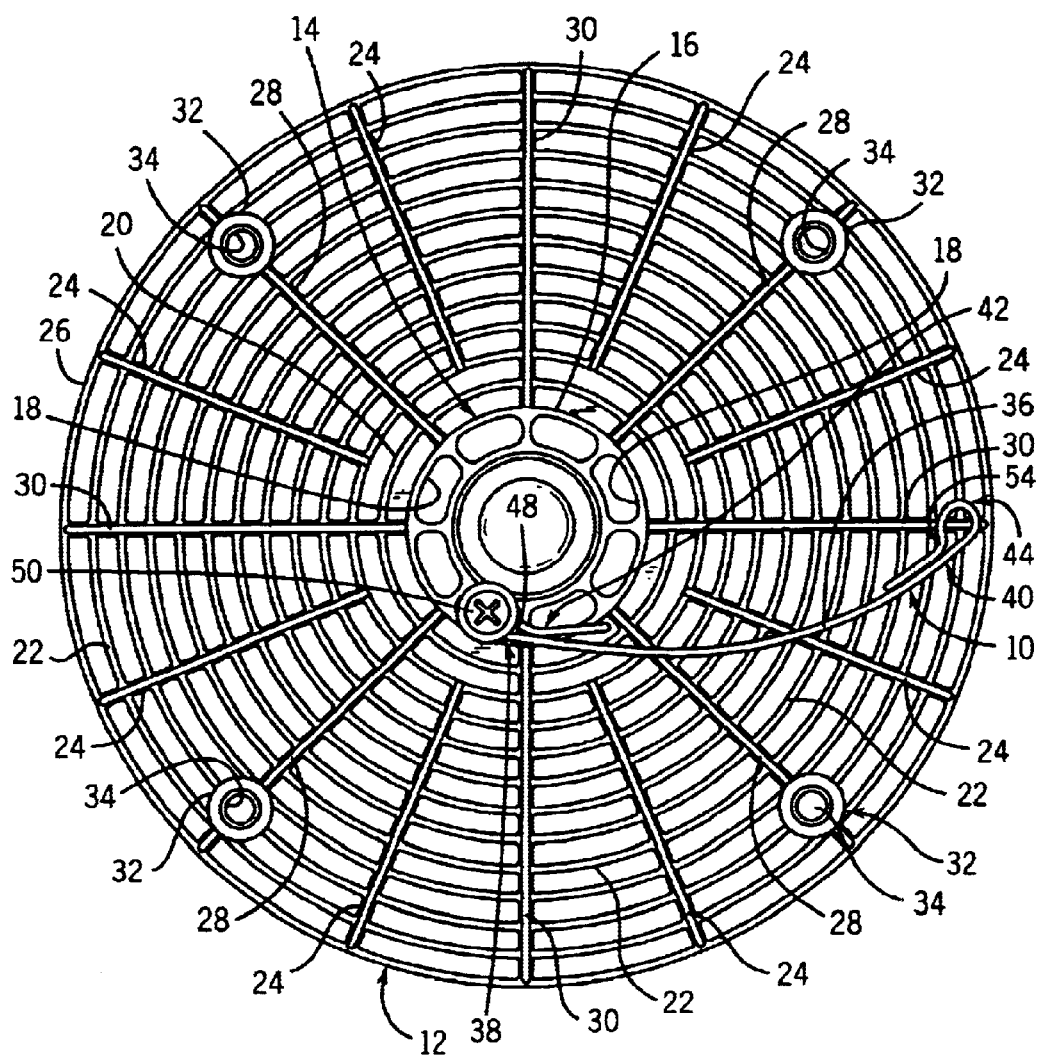
FIG. 1 is a top plan view of a first embodiment of a deflection member in accordance with the present invention mounted on an air intake screen of a lawnmower.
Figure 2:
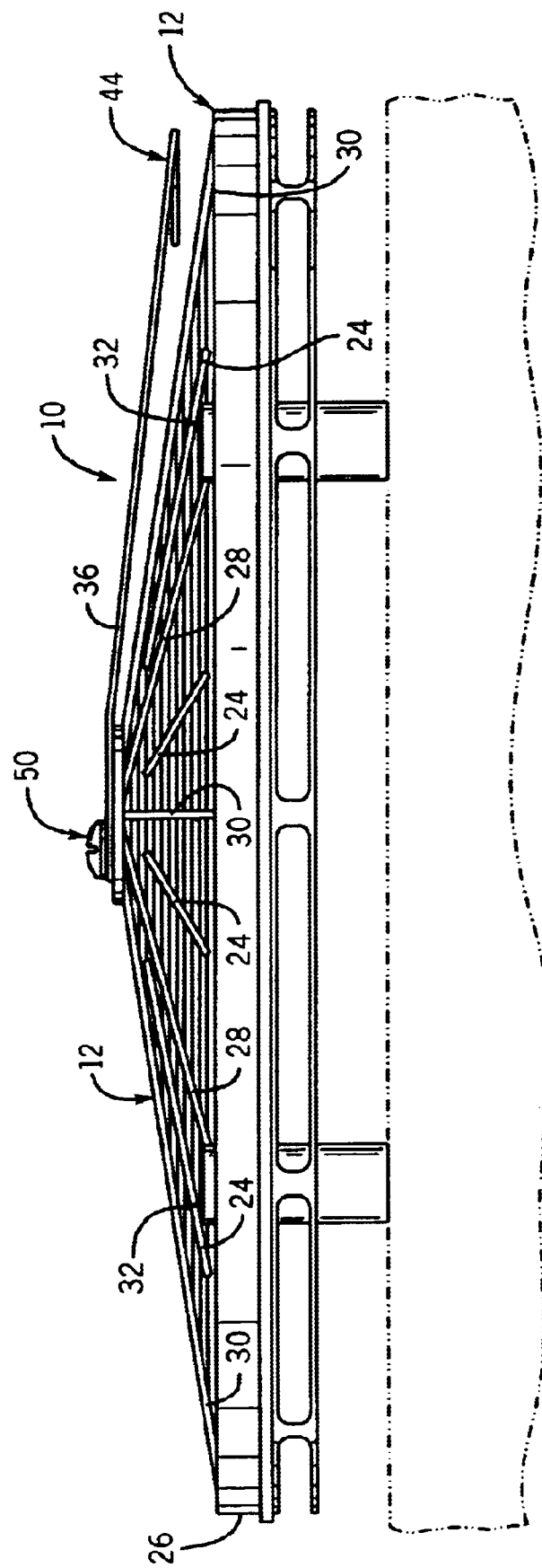
FIG. 2 is a side elevational view of the deflection member of FIG. 1 mounted on an air intake screen of a lawnmower.

Referring to FIGS. 1 and 2, a first embodiment of a deflection member in accordance with the present invention is generally designated by the reference numeral 10. It is intended that deflection member 10 be mounted on air intake screen 12 and that air intake screen 12 be placed over the air intake port of a conventional lawnmower. It is contemplated that air intake screen 12 be operatively connected to the flywheel of the engine of the lawnmower for rotational movement therewith. However, air intake screen 12 may be fixed to the lawnmower without deviating from the scope of the present invention.

Air intake screen 12 includes a generally disc-shaped central hub 14. Central hub 14 includes a radially outer edge 16 and a plurality of circumferentially spaced apertures 18 adjacent outer edge 16. Apertures 18 through central hub 14 of air intake screen 12 facilitate the mounting of deflection member 10 thereto, as hereinafter described. Air intake screen 12 further includes inner ring 20 which extends circumferentially about and is radially spaced from outer edge 16 of central hub 14. A series of concentric rings 22 are spaced along an axis extending radially from outer edge 16 of central hub 14. Rings 22 are interconnected by a plurality of radially extending spokes 24 that are circumferentially spaced about outer edge 16 of central hub 14. Rings 22 and spokes 24 define passageways for allowing anbiant air to be drawn through air intake screen 12 into the air take port of the lawnmower.

Air intake screen 12 further includes an radially outer ring 26 extending about the outer periphery thereof. Outer edge 16 of central hub 14 and outer ring 26 are interconnected by a plurality of mounting spokes 28 and support spokes 30. Support spokes 30 are circumferentially spaced about outer edge 16 of central hub 14. Similarly, mounting spokes 28 are also circumferentially spaced about and extend radially from outer edge 16 of central hub 14. Mounting spokes 28 include mounting elements 32 formed therein. Mounting elements 32 in mounting spokes 28 include mounting apertures 34 therethrough to facilitate the mounting of air intake screen 12 to a lawnmower.

Deflection member 10 includes a generally arcuate deflection arm 36 having a radially inner end 38 and a radially outer end 40. Inner element 42 is interconnected to radially inner end 38 of deflection arm 36 and outer element 44 is interconnected to radially outer end 40 of deflection arm 36. Inner element 42 is folded back upon deflection arm 36 so as to define an opening 48. Screw 50 is provided to interconnected deflection member 10 to air intake screen 12. Screw 50 includes an enlarged head and a shaft that extends through opening 48 defined by inner element 42 and is threaded into a corresponding aperture 18 in central hub 14 of air intake screen 12. Outer element 44 is folded back onto deflection arm 36 so as to define an opening 54. As best seen in FIG. 2, outer end 40 of deflection arm 36 and outer element 44 interconnected thereto are vertically spaced from air intake screen 12.

In operation, the flywheel of the engine of the lawnmower rotates in a conventional manner so as to draw ambient air through air intake screen 12 and to direct a cooling stream of air across the cylinders and other parts of the engine. As heretofore described, air intake screen 12 is operatively connected to the flywheel of the engine for rotational movement therewith. It can be appreciated that the air drawn into the air intake port through air intake screen 12 may carry grass clippings and other debris therewith. It is intended that deflection arm 36 of deflection member 10 engage the grass clippings and other debris carried by the ambient air drawn into the air intake port through air intake screen 12 so as to deflect such grass clippings and other debris away from air intake screen 12. As a result, the quantity of grass clippings and other debris entering the air intake port of a conventional lawnmower through air intake screen 12 is reduced.

Figure 3:
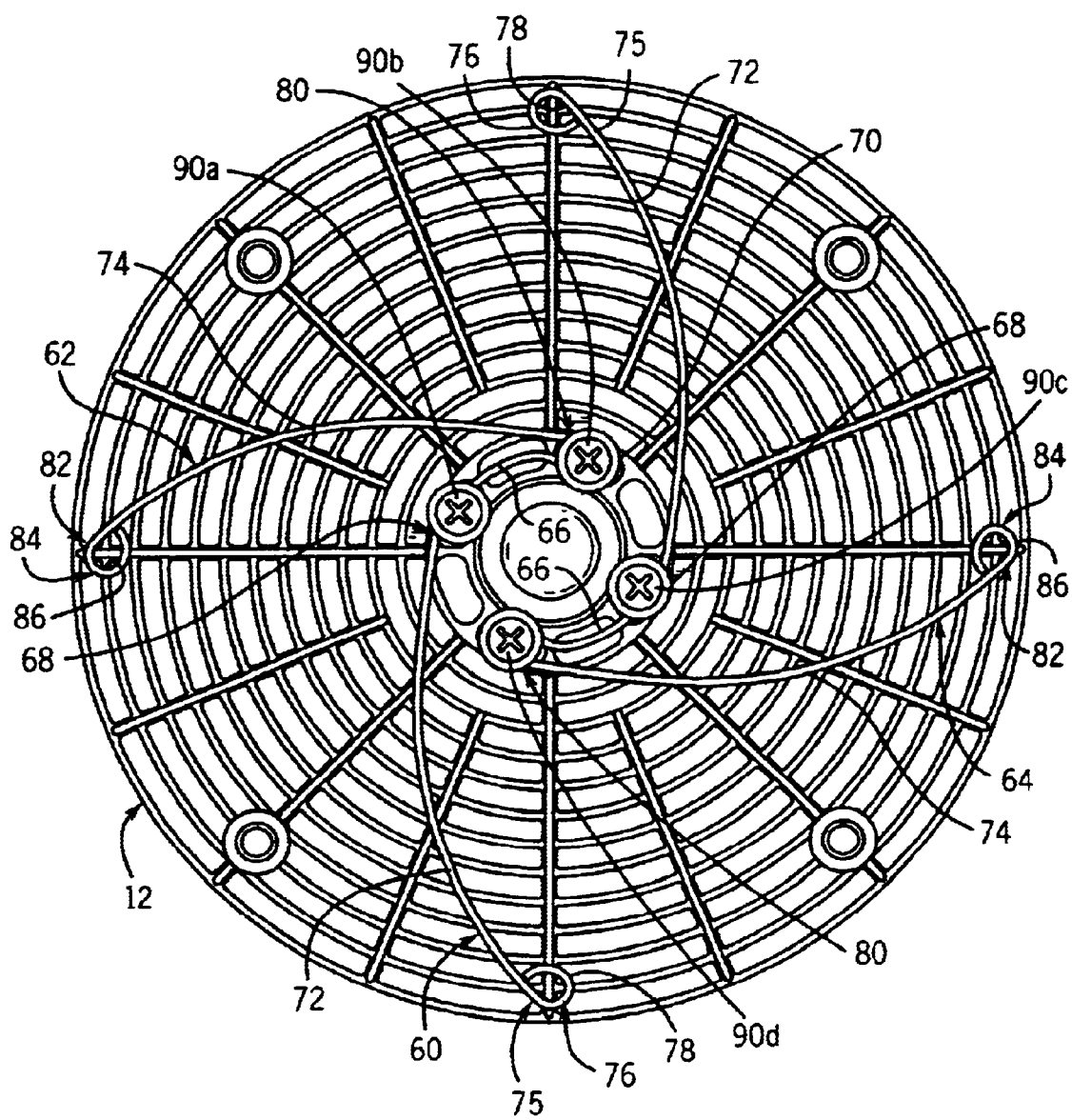
FIG. 3 is a top plan view of a second embodiment of a deflection member in accordance with the present invention mounted on an air intake screen of a lawnmower.
Figure 4:
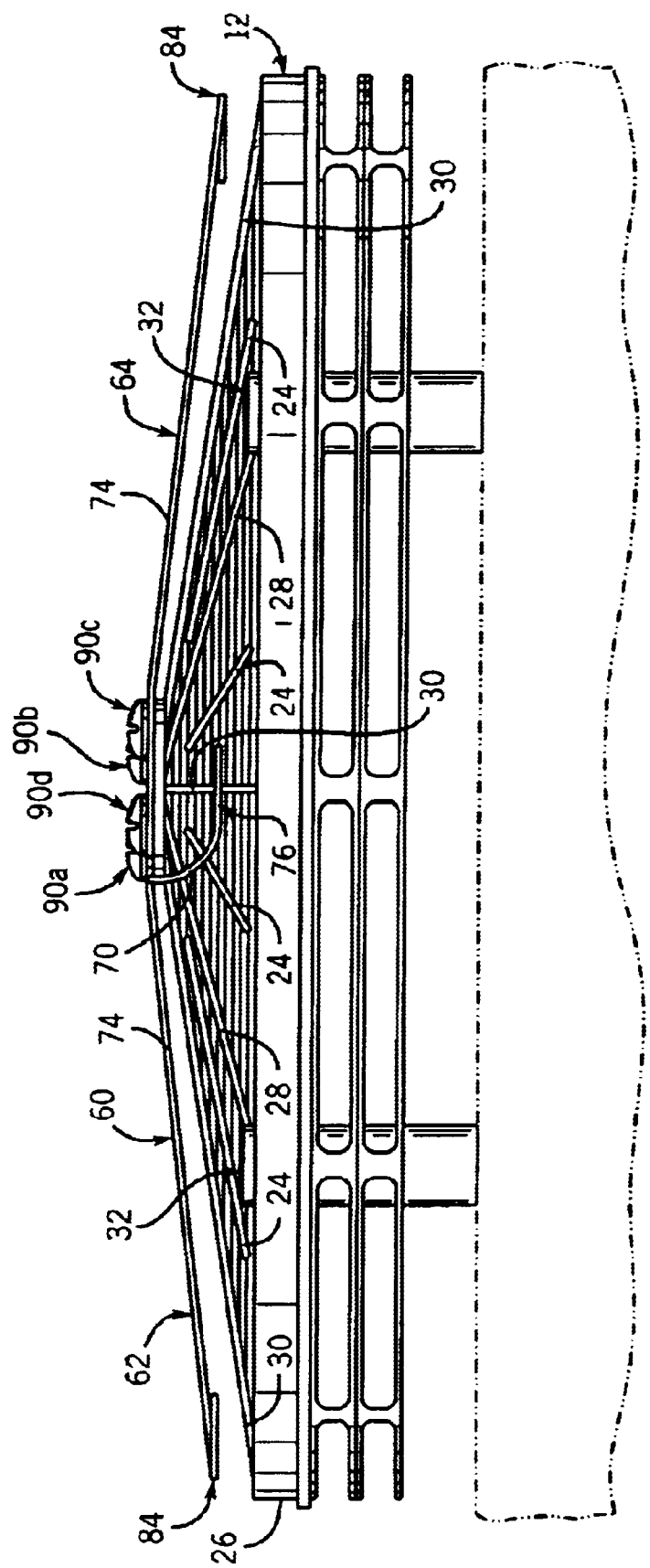
FIG. 4 is a side elevational view of the deflection member of FIG. 3 mounted on an air intake screen of a lawnmower.
Figure 5:
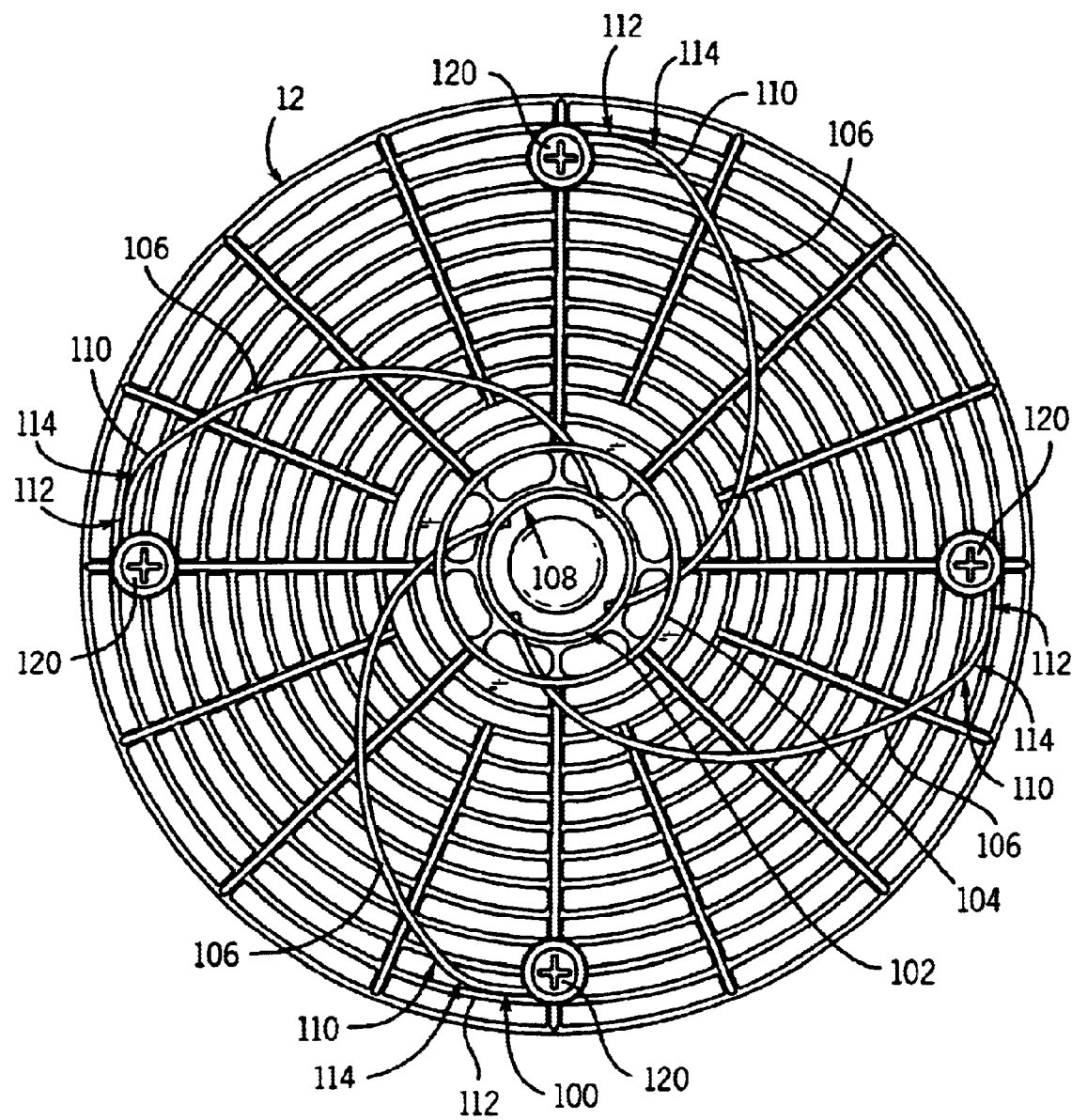
FIG. 5 is a top plan view of a third embodiment of a deflection member in accordance with the present invention mounted on an air intake screen of a lawnmower.
Figure 6:
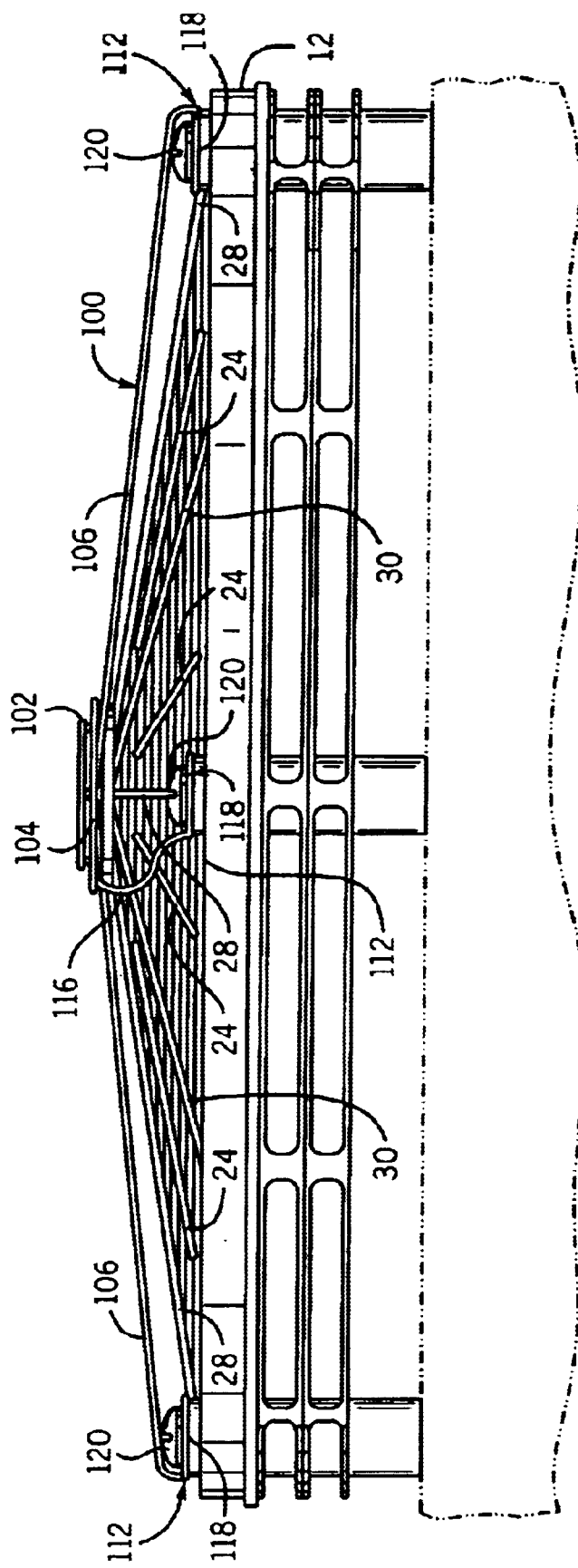
FIG. 6 is a side elevational view of the deflection member of FIG. 5 mounted on an air intake screen of a lawnmower.

Referring to FIGS. 3 and 4, a second embodiment of a deflection member in accordance with the present invention is generally designated by the reference numeral 60. It is intended that deflection member 60 be mounted to air intake screen 12 that is operatively connected to the flywheel of the engine of a conventional lawnmower, as heretofore described. Deflection member 60 includes first and second deflection elements 62 and 64, respectively. Deflection elements 62 and 64 are identical in structure, and as such, the description hereinafter of deflection element 62 is understood to describe deflection element 64 as fully described hereinafter.

Deflection element 62 includes central portion 66 having first and second ends 68 and 70, respectively. First and second, generally arcuate deflection arms 72 and 74, respectively, extend from corresponding ends 68 and 70 of central portion 66 of deflection element 62. First deflection arm 72 terminates at a radially outer end 75 having outer element 76 interconnected thereto. Outer element 76 is folded back onto outer end 75 of first deflection arm 72 so as to define an opening 78.

Second deflection arm 74 extends from second end 70 of central portion 66 of deflection element 62. Second deflection arm 74 includes radially inner end 80 that is in close proximity to central portion 66 of deflection element 62 and radially outer end 82 having outer element 84 interconnected thereto. Outer element 84 is folded back onto outer end 82 of second deflection arm 74 of deflection element 62 so as to define opening 86.

Screws 90*a*–90*d* interconnect deflection member 60 to air intake screen 12. Screw 90*a* includes an enlarged head and a shaft inserted into the corresponding aperture 18 in central hub 14 of air intake screen 12 so as to capture first end 68 of central portion 66 of deflection element 62 between air intake screen 12 and the head of screw 90*a*. Screw 90*b* includes an enlarged head and a shaft extending between inner end 80 of second deflection arm 74 of deflection element 62 and central portion 66 of deflection element 62 into a corresponding aperture 18 in central hub 14 of air intake screen 12 so as to capture inner end 80 of second deflection arm 74 of deflection element 62 between air intake screen 12 and the head of screw 90*b*. Screw 90*c* includes an enlarged head and a shaft threaded into a corresponding aperture 18 in central hub 14 of air intake screen 12 so as to capture the first end 68 of central portion 66 of deflection element 64 between air intake screen 12 and the head of screw 90*c*. Screw 90*d* includes an enlarged head and a shaft extending between central portion 66 of deflection element 64 and inner end 80 of second deflection arm 74 of deflection element 64 into a corresponding aperture 18 and central hub 14 of air intake screen 12 so as to capture second deflection arm 74 between air intake screen 12 and the head of screw 90*d*.

In operation, as heretofore described, air intake screen 12 is operatively connected to the flywheel of the engine for rotational movement therewith. It is intended that first and second deflection arms 72 and 74, respectively, of deflection elements 62 and 64 of deflection member 60 engage the grass clippings and other debris carried by the air drawn into the air intake port through air intake screen 12 so as to deflect such grass clippings and debris away from air intake screen 12. As a result, the quantity of the grass clippings and other debris entering the air intake portion of a conventional lawnmower through air intake screen 12 is reduced.

Referring to 5 and 6, a third embodiment of a deflection member in accordance with the present invention is generally designated by the reference numeral 100. It is intended that deflection member 100 be mounted on air intake screen 12 that is operatively connected to the flywheel of the engine of the conventional lawnmower, as heretofore described. Deflection member 100 includes inner and outer, radially spaced, concentric rings 102 and 104, respectively, interconnected by a purality of deflection arms 106. Each deflection arm 106 is generally arcuate in shape and includes a radially inner end interconnected to inner ring 102. In addition, each deflection arm 106 is also interconnected to outer ring 104.

Deflection member 100 further includes outer elements 112 extending circumferentially from corresponding outer ends 110 of deflection arms 106 such that outer elements extend about inner and outer rings 102 and 104, respectfully. Each outer element 112 includes a first end 114 interconnected to outer end 110 of a corresponding deflection arm 106 and a second end 118 folded onto itself to define an opening. Screws 120 are provided to interconnect deflection number 100 to air intake screen 12. Screw 120 include enlarged heads and shafts that extend through corresponding openings defined by second ends 118 of outer elements 112 into mounting apertures 34 in mounting elements 32 of corresponding mounting spokes 28 of air intake screen 12.

As heretofore described, air intake screen 12 is operatively connected to the flywheel of the engine of a conventional lawnmower for rotational movement therewith. It is intended that deflection arms 106 engage any grass clippings or other debris carried by the air drawn into the air intake port through air intake screen 12 so as to deflect such grass clippings and other debris away from air intake screen 12. As a result, the quantity of grass clippings and other debris entering the air intake port of the lawnmower through air intake screen 12 is reduced.

Figure 7:
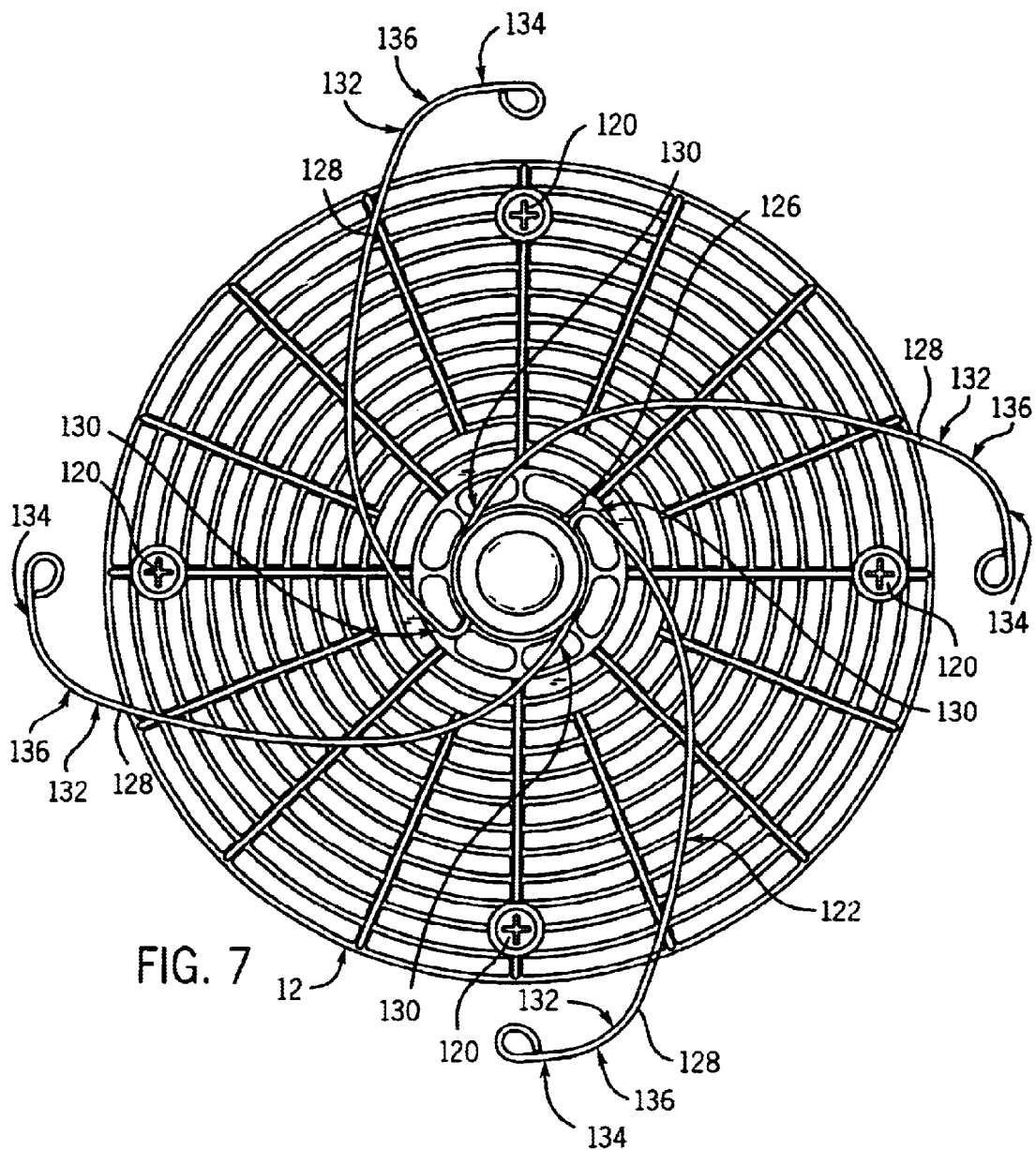
FIG. 7 is a top plan view of a fourth embodiment of a deflection member mounted on a housing about an air intake screen of a lawnmower.
Figure 8:
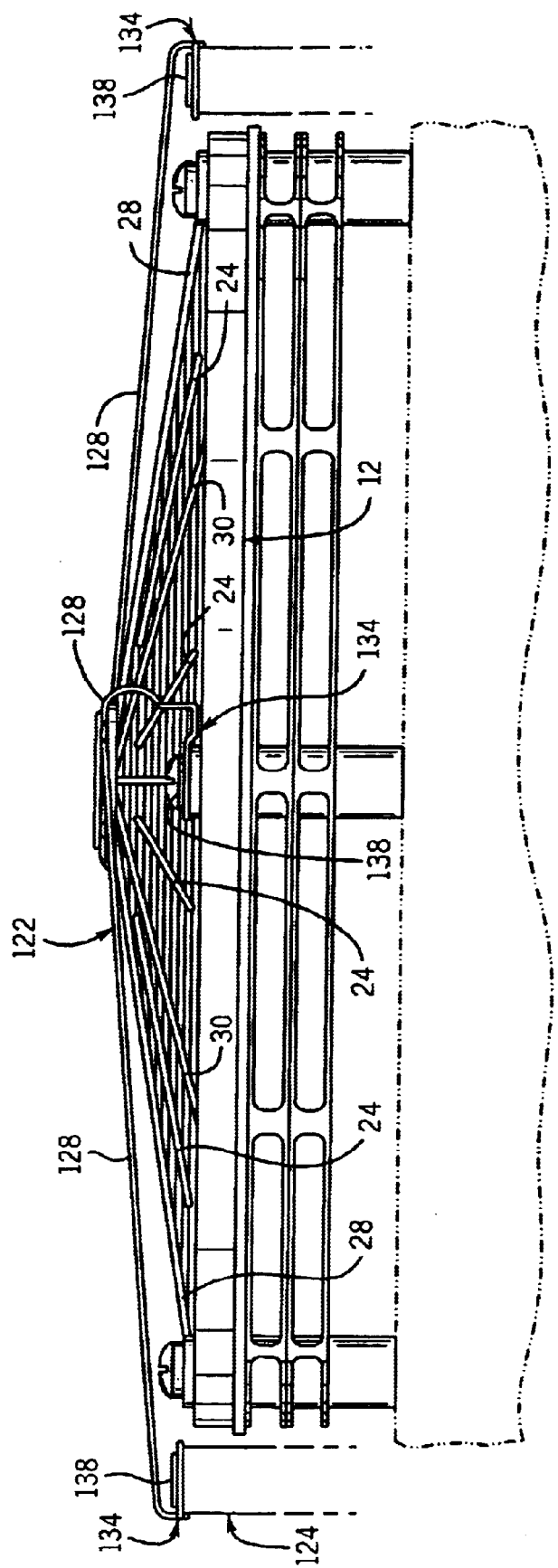
FIG. 8 is a side elevational view of the deflection member of FIG. 7 mounted on a housing about an air intake screen of a lawnmower.

Referring to FIGS. 7 and 8, a fourth embodiment of a deflection member in accordance with the present invention is generally designated by the reference numeral 122. It is intended that deflection member 122 be mounted on housing 124 extending about the outer periphery of air intake screen 12. Deflection member 122 includes a central ring 126 positioned over central hub 14 of air intake screen 12. Generally arcuate deflection arms 128 extend radially from central ring 126. Deflection arms 128 include radially inner ends 130 interconnected to central ring 126 and radially outer ends 132. Radially inner ends 130 of deflection arms 128 are circumferentially spaced about central ring 126.

Outer elements 134 extends circumferentially about central ring 126 of deflection member 122. Outer elements 134 include first ends 136 interconnected to radially outer ends 132 of corresponding deflection arms 128 and second ends folded back onto themselves so as to define openings. Screws 138 are provided to interconnect deflection member 122 to housing 124. Screws 138 include enlarged heads and shafts extending through the openings defined by second ends 136 of corresponding outer elements 134 into corresponding apertures in housing 124.

As heretofore described, air intake screen 12 is operatively connected to the flywheel of the engine of a conventional lawnmower for rotational movement therewith. It is intended that grass clippings and other debris carried by the air drawn through air intake screen 12 engage deflection arms 128 of deflection member 122 such that the deflection arms 128 deflect such grass clippings and other debris away from air intake screen 12. As a result, the quantity of grass clippings and other debris entering the air intake port of a conventional lawnmower through air intake screen 12 is reduced.

Various modes of carrying out the invention are contemplated as being within the scope of the following claims particularly pointing out and distinctly claiming the subject matter which is regarded as the invention.

We claim:

1. A deflector for deflecting foreign matter from the inlet screen of a rotary lawn mower having an engine, the engine drawing air through the inlet screen, the deflector comprising:
    an inner element positionable over a center portion of the inlet screen;
    a first outer element positionable over a radially outer portion of the inlet screen; and
    a first deflection arm extending between the inner element and the first outer element, the first deflection arm being generally arcuate.

2. A deflector for deflecting foreign matter from the inlet screen of a rotary lawn mower having an engine, the engine drawing air through the inlet screen, the deflector comprising:
    an inner element positionable over a center portion of the inlet screen, the inner element defining an opening therethrough;

a connector extending through the opening in the inner element for interconnecting the inner element to the center portion of the inlet screen;

a first outer element positionable over a radially outer portion of the inlet screen; and a first deflection arm extending between the inner element and the first outer element.

3. The deflector of claim 2 wherein the inner element defines a second opening therethrough and wherein the deflector further comprises a second connector extending through the second opening in the inner element for interconnecting the inner element to the center portion of the inlet screen.

4. The deflector of claim 3 further comprising a second outer element positionable over the radially outer portion of the inlet screen circumferentially spaced from the first outer element and a second deflection arm extending between the inner element and the second outer element.

5. A deflector for deflecting foreign matter from the inlet screen of a rotary lawn mower having an engine, the engine drawing air through the inlet screen, the deflector comprising:

a inner element positionable over a center portion of the inlet screen;

a first outer element positionable over a radially outer portion of the inlet screen, the first outer element defining an opening therethrough; and a first outer deflection element positionable over a radially outer portion of the inlet screen;

a connector extending through the opening in the first outer element for interconnecting the first outer element to the radially outer portion of the inlet screen; and a first deflection arm extending between the inner element and the first outer element.

6. The deflector of claim 5 further comprising a second outer element positionable over the radially outer portion of the inlet screen at a location circumferentially spaced from the first outer element and a second deflection arm extending between the inner element and the second outer element.

7. The deflector of claim 6 wherein the second outer element defines an opening therethrough and wherein the deflector further comprises a second connector extending through the opening in the second outer element for interconnecting the second outer element to the radially outer portion of the inlet screen.

8. The deflector of claim 7 wherein the inner element includes an inner ring and wherein the deflection arms terminate at radially inner ends and radially outer ends.

9. The deflector of claim 8 wherein the radially inner ends of the deflection arms are affixed to the inner ring of the inner element.

10. The deflector of claim 9 wherein the inner element includes a second outer ring radially spaced from the inner ring and wherein the outer ring is affixed to the deflection arms at a location radially spaced from the inner ends of the deflection arms.

11. The deflector of claim 8 wherein the each outer element includes a circumferentially extending portion that is radially spaced and extends circumferentially about inner ring.

12. In a lawn mower having an engine and an air intake screen adjacent the engine to allow the engine drawing air through the air intake screen to cool the engine during the operation thereof, the air intake screen having a central portion and a radially outer portion, the improvement comprising:

a central hub positioned over the central portion of the air intake screen;

a first deflection arm extending radially from the central hub over the air intake screen; and a second deflection arm extending radially from the central hub over the air intake screen at a location circumferentially spaced from the first deflection arm.

13. In a lawn mower having an engine and an air intake screen adjacent the engine to allow the engine drawing air through the air intake screen to cool the engine during the operation thereof, the air intake screen having a central portion and a radially outer portion, the improvement comprising:

a central hub positioned over the central portion of the air intake screen, the central hub including:
a first inner ring having a predetermined diameter; and
a second outer ring having a predetermined diameter greater than the diameter of the inner ring; and
a first deflection arm extending radially from the central hub over the air intake screen.

14. The improvement of claim 13 wherein the inner and outer rings of the central hub are interconnected by the first deflection arm.

15. In a lawn mower having an engine and an air intake screen adjacent the engine to allow the engine drawing air through the air intake screen to cool the engine during the operation thereof, the air intake screen having a central portion and a radially outer portion, the improvement comprising:

a central hub positioned over the central portion of the air intake screen,the central hub including an aperture therethrough;

a connector extending through the aperture in the central hub for interconnecting the central hub to the lawn mower; and a first deflection arm extending radially from the central hub over the air intake screen.

16. The improvement of claim 15 wherein the first deflection arm terminates at a radially outer end and wherein the improvement further comprises an outer element interconnected to the radially outer end of the first deflection arm and being positioned over the radially outer portion of the air intake screen.

17. The improvement of claim 16 wherein the outer element includes an aperture therethough and wherein the improvement further comprises a connecter extending through the aperture for interconnecting the outer element to the lawn mower.

18. The improvement of claim 16 wherein the outer element extends circumferentially about the central hub.

19. A device for deflecting foreign matter away from an air intake screen of a lawn mower, the lawn mower including an engine that draws air through the air intake screen during the operation thereof, compromising:

a deflector positionable over the air intake screen,the deflector including a central hub including:
a first inner ring having a predetermined diameter; and
a second outer ring having a predetermined diameter greater than the diameter of the inner ring; and
a connector for interconnecting the deflector to the lawn mower.

20. The device of claim 19 wherein the inner and outer rings of the central hub are interconnected by the first deflection arm.

21. The device of claim 20 wherein the deflector includes a second deflection arm extending from the central hub.

22. The device of claim 21 wherein the second deflection arm interconnects the inner and outer rings of the central hub.

* * * * *